UNITED STATES PATENT OFFICE.

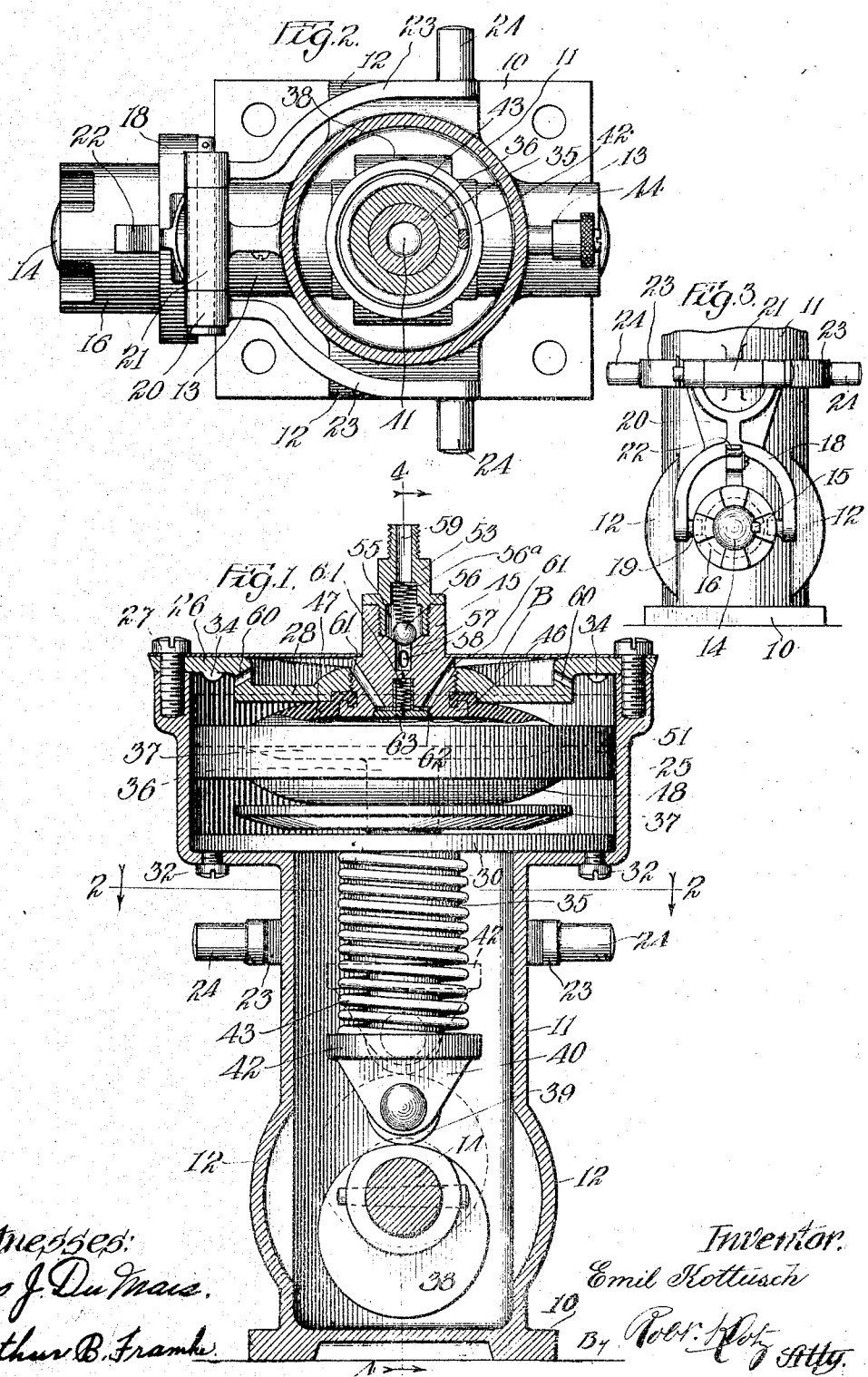

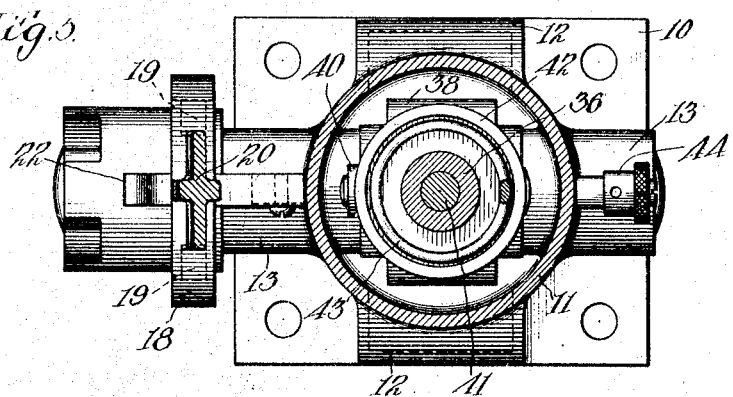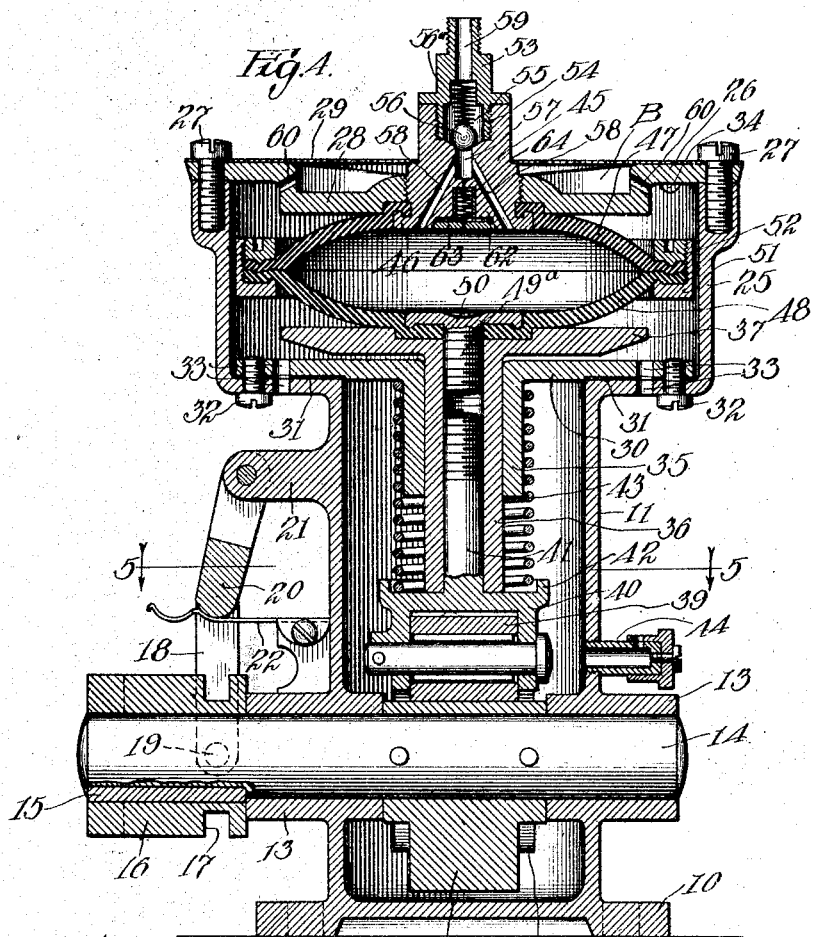

EMIL KOTTUSCH, OF CHICAGO, ILLINOIS, ASSIGNOR, BY MESNE ASSIGNMENTS, TO GUSTAVE C. DREWS AND WILLIAM C. LAUBE, BOTH OF CHICAGO, ILLINOIS.

PUMP.

1,186,664.      Specification of Letters Patent.      Patented June 13, 1916.

Application filed December 11, 1914. Serial No. 876,616.

*To all whom it may concern:*

Be it known that I, EMIL KOTTUSCH, a subject of the Emperor of Germany, residing at Chicago, in the county of Cook and State of Illinois, have invented certain new and useful Improvements in Pumps, of which the following is a specification.

This invention relates to pumps of the type particularly designed for the inflating of pneumatic tires with pure, unsullied air, wherein the lubricating oil used for the moving parts of the pump is isolated from the air chamber, so that the air discharged by the pump is cool and free from oil, which is particularly damaging to tires.

A further object of the present invention is to centralize the air intake and outlet valves so that a ready concentration of the air and the proper circulation thereof may be obtained.

With the above and other objects in view, this invention consists in the construction, combination, and arrangement of parts all as hereinafter more fully described, claimed, and illustrated in the accompanying drawings, wherein:

Figure 1 is a central vertical section of a pump constructed in accordance with the present invention, parts thereof being shown in dotted lines to illustrate the movement thereof; Fig. 2 is a horizontal section along line 2—2 of Fig. 1; Fig. 3 is an elevation of the pump taken from the left of Fig. 2, to illustrate the driving clutch thereof; Fig. 4 is a vertical section taken at right angles to Fig. 1, along the line 4—4 of Fig. 1; and Fig. 5 is a horizontal section taken along line 5—5 of Fig. 4.

While the present invention may be used for pumping air and other fluids for general purposes, it is particularly designed for the inflating of pneumatic tires for motor-driven vehicles, whereby the pump will receive its power from the crank shaft or other source, of the engine or motor of the vehicle, it being particularly desirable while using the pump for tire inflation or, in fact for any other purpose, to have the moving parts thereof operate very rapidly, and for this reason the pump is usually connected directly to the crank shaft of the engine, though this is not necessary. Furthermore, in the inflation of pneumatic tires embodying rubber, oil causes the rubber to rot or decay, and, this being so, it is essential that all of the lubricating oils be isolated and removed from the air chamber.

Reference being had more particularly to the drawings, 10 indicates a base plate of any suitable size and shape, having a cylinder 11 mounted or otherwise formed thereon, said cylinder being provided with diametric convexed portions 12 in its wall, by means of which the necessary rotation of the driving elements may be had, as will hereinafter be seen. Adjacent to the lower terminal of this cylinder, the wall thereof is provided with the diametrically-disposed bearings 13 in which rotates the drive shaft 14 of the pump. This drive shaft projects at one end beyond its bearings, and at that projecting end is provided with a key 15, upon which is mounted a clutch member 16, said clutch member being reciprocable upon the shaft and adapted to rotate therewith. While the source of power for rotating the shaft 14 is not disclosed in the drawings, the pump may be located adjacent to the engine of the car, and the crank shaft of said engine may be provided with a clutch similar to the clutch member 16, so that the member 16 may be reciprocated to interlock with the clutch member on the crank shaft of the engine, thereby causing the shaft 14 to be rotated synchronously with the engine movements. In order to impart the necessary movement to the clutch 16 and retain such clutch member in its adjusted position, the same is circumferentially grooved as at 17 and embraced by a yoke 18, which is provided with inwardly extending lugs 19 at the terminal of each arm, which are received in the grooves 17. This yoke 18 has an arm 20 secured thereto which, at its upper end, is bifurcated to embrace the projection 21 upon the cylinder 11, to which projection the arm 20 is pivoted. By oscillating the arm 20 and consequently the yoke 18, the clutch 16 may be adjusted upon the shaft 14, and, to hold the clutch member and consequently the yoke 18 and arm 20 in their adjusted positions, a spring 22 is secured to the body of the cylinder and operates under the arm 20, said spring being notched or bent at its free terminal, as illustrated in Fig. 4, to engage the terminal of the arm 20 and hold these elements in their adjusted positions. The terminal of the arm 20, which is bifurcated, has secured to each arm of the bifurcation an arm 23, which terminates in a handle 24, whereby the proper leverage to oscillate the yoke and arm 18 and 20, respectively, may be attained, and these elements oscillated properly and with ease.

At its upper end, the cylinder 11 is enlarged to form a casing 25, which casing, as will hereinafter be apparent, incloses the air chamber of the pump. This casing 25 is closed by a top plate 26 attached to the casing 25 by means of the bolts 27, and is provided with a central concentric depression 28, the utility of which will be hereinafter apparent. A cover plate 29 rests flush upon the top plate 26 and is secured to the casing 25 likewise by means of the bolts 27, said cover plate 29, in combination with the depression 28 in the top plate, forming a completely inclosed air intake chamber, as will be apparent.

As has heretofore been stated, the casing 25 incloses the air chamber, and, inasmuch as the cylinder 11 incloses the working parts of the pump and, therefore, operates in oil, it is essential to isolate the cylinder 11 from the interior of the casing 25; and for this purpose a partition plate 30 is mounted on the shoulder between the cylinder 11 and the casing 25, said plate having a rubber washer 31 inlaid therein which rests upon the shoulder above referred to. This partition plate is held in place by the bolts 32, which pierce both the shoulder between the casing 25 and cylinder 11 and the partition plate 30. Registering air intake openings 33 pierce the shoulder between the casing 25 and cylinder 11 and the plate 30, so that the air or other fluid may pass from the exterior of the pump to the air chamber inclosed in the casing 25. Other air intakes 34 are provided adjacent to the upper end of the casing 25, and, in combination with the air intakes 33, constitute the means for obtaining the air supply for the chamber of the casing 25. A bearing or bushing 35 is concentrically formed upon the partition plate 30 and projects into the cylinder 11 and forms the bearing for what ordinarily would be the piston rod of the pump, but which, in the present instance, merely constitutes a plunger, as will hereinafter be seen. Mounted for reciprocation through the bearing or bushing 35 is an interiorly threaded sleeve 36, which at its upper end is provided with a transverse concentric plate 37, said plate 37 being located within the casing 35, while the sleeve is, under normal conditions, located within the cylinder 11. An eccentric or cam 38 is keyed to the shaft 14 and is arranged to rotate therewith for the purpose of reciprocating the sleeve 35. This eccentric 38 contacts with a roller 39 mounted in a bracket 40. A shank 41, exteriorly threaded at its extreme free terminal, is concentrically secured to the bracket 40 and at its base is encircled by a cup 42, in which lower terminal is a helical coil spring 43, which encircles the bushing or bearing 35 and the sleeve 36. The upper end of this spring 43 bears against the partition plate 30 adjacent to the bushing or bearing 35. The shank 41 of the bracket 40 is threaded into the sleeve 36, so that the sleeve, bracket 40, and roller 39 operate as a unit, which unit is held in contact with the cam or eccentric 38 by means of the spring 43. Thus, upon the rotation of the shaft 14, the cam 38 by its contact with the roller bearing 39 imparts a reciprocatory movement to the sleeve 36, and, consequently, to the plate 37 in the casing 25.

The lower end of the cylinder surrounding the roller bearing 39, the bearings 13, and the shaft 14, contains lubricating oil. For the purpose of supplying this portion of the cylinder with lubricating oil, a valve and supply tap 44 is provided in the cylinder 11, directly above one of the bearings 13, so that, as the cam or eccentric 38 rotates in the lower end of the cylinder 11 and the convex portions 12 thereof, the entire cylinder, the interior of the cylinder, and the working parts therein, are lubricated by what is commonly known as the splash system. It is, therefore, apparent that unless the casing 25 is isolated from the cylinder 11, this splash system would entirely saturate the air within the casing 25 with oil, whereas, by the provision of the partition plate 30, no oil comes in contact, directly or indirectly, with the air in the casing 25.

The depression 28 of the top plate is provided with a central interiorly threaded orifice into which the plug 45 is threaded, said plug being provided with a shoulder and extending through the central aperture in the cover plate 29. The lower end of the plug 45 is provided with a shouldered lip 46, which registers and coöperates with a groove formed concentrically on the inner face of the depression of the top plate 29 adjacent to the orifice into which the plug 45 is threaded. Between the shouldered lip 46 and the groove in the depression 28 is held a rubber or other elastic diaphragm 47, said diaphragm encircling the lower terminal of the plug 45 above the shouldered lip 46, and clamped between the shouldered lip 46 and the top inner surface of the depression 28 of the top plate, when the plug 45 is threaded into its normal position. A similar diaphragm 48 is secured in a central depression formed in the plate 37, by means of a bolt 49 threaded into the upper terminal of the sleeve 36. The head 50 of this bolt 49 rests upon the inner surface of the diaphragm 48 and forces the same into the depression of the plate 37. In this manner, the two diaphragms 47 and 48 are rigidly secured hermetically to the sleeve 36 and the plate 37 and to the plug 45, respectively.

These diaphragms 47 and 48 are of equal diameter and, as illustrated in Fig. 4, are bent to have their peripheries rest in close proximity, the periphery of the lower diaphragm 48 resting upon a shoulder of the interiorly threaded ring 51, while the periphery of the upper diaphragm 47 is clamped upon the periphery of the lower diaphragm 48 by means of a clamping ring 52 threaded into the ring 51. The rings 51 and 52 operate as a unit and the inner surfaces of each, viz., the surfaces operating against the peripheries of the diaphragms 47 and 48, are irregular, so that in clamping the said peripheries of the diaphragms together, an air-tight and hermetically sealed joint is produced. It is manifest, from the foregoing, that as the sleeve 36 reciprocates in the manner heretofore described, the diaphragms 47 and 48 are brought together and separated, creating a fanning action in the casing 25 and creating an alternate compression and suction within the chamber A formed between the diaphragms. This fanning action caused by the movement of the diaphragms 47 and 48 causes air to flow into the casing 25 through the air intakes 33 and 34. When the sleeve 36 moves upwardly, the plate 37 contacts against the diaphragm 48, while the upper diaphragm 47 contacts with the depression 28 of the top plate 26. This braces the diaphragm and prevents damage when a compression is created in the chamber A, which is when the sleeve 36, the plate 37, and diaphragm 48 move upwardly; when a reversed motion is imparted to these elements, a suction is created in the chamber A.

The plug 45 contains the air intake for the chamber A and the air exhaust, so that both the intake and the exhaust are centralized at one point. For this purpose, an exteriorly threaded exhaust union 53 is secured to the outer terminal of the plug 45 by means of a projection 54 threaded into an interiorly threaded passage 55 in the outer end of the plug 45. A spring-actuated ball valve 56 operates in the passage 55, and normally tends to close the central exhaust passage 57 of the plug, which latter, in turn, connects with the divergent exhaust or outlet passages 58 extending from the central exhaust or outlet passage 57 to the lower terminal of the plug 45, adjacent to the shouldered lip 46 thereof. When a compression is created in the chamber A by the upward movement of the lip 46, plate 47 and diaphragm 48, the air contained in this chamber A passes through the divergent, or then convergent, exhaust passages 58 to the central exhaust passage 57, forcing the ball valve 56 upwardly against the action of its spring 56ª and permitting the air to pass through the passage 59 of the exhaust union 53.

The chamber B located between the cover plate 29 and the depression 28 of the top plate, constitutes an intermediate air reservoir into which the air is drawn through the passages 60 from the casing 25 after the air enters said casing through the passages 33 and 34. From this intermediate air reservoir B the air is drawn into the chamber A when a suction is created therein, viz., when the sleeve 36, plate 37, and the lower diaphragm 48 move downwardly through the convergent intake passages 61, which communicate at their upper terminals with chamber B and at their lower terminals with the chamber A at approximately the center of the plug 45 where a concentric valve seat 62 is provided. The plate valve 63 is mounted in this valve seat 62 and is held in place by a retractile spring in the chamber A as heretofore described, this suction in combination with the pressure in the intermediate reservoir B forces the plate valve 63 from its seat 62 and permits air to enter the chamber A through the passages 61. And when a compression is created in the chamber A as heretofore described, this pressure closes the valve 63 and forces the air out through the passages 58, 55, and 59.

From the foregoing it is apparent that air drawn into the casing 25, then into the intermediate reservoir B and later drawn into the chamber A and exhausted therefrom under pressure, is entirely free from dust and dirt, and, owing to the quick action of the parts, is forced from the pump at practically a continuous flow. By having the diaphragms 47 and 48 reinforced, and the intake and exhaust centralized, greater efficiency is produced and the cleanliness and coolness of the air is insured, as distinguished from the pump of the piston type whereby the air ejected therefrom receives not only the heat of the friction but also is saturated with oil.

I claim as my invention:

1. In an air pump, a cylinder, a plunger adapted to reciprocate in said cylinder, eccentric mechanism in said cylinder for reciprocating said plunger, an air chamber above said cylinder, a compression and suction diaphragm in said chamber, operatively mounted on the plunger, a separating partition between the cylinder and air chamber having a slideway through which the plunger passes, and valve mechanism attached to the top of the diaphragm, opposite the point of attachment of the plunger.

2. In an air pump, a cylinder, a plunger adapted to reciprocate in said cylinder, an air chamber above said cylinder, a compression and suction diaphragm in said air chamber, operatively mounted on the plunger and a plate closing the top of the air chamber and carrying a combined intake and exhaust valve mechanism which is attached to the top of the diaphragm opposite the point of attachment of the plunger.

3. In an air pump, a cylinder, a plunger adapted to reciprocate in said cylinder, an air chamber above said cylinder, a compression and suction diaphragm in said air chamber, operatively mounted on the plunger, a plate closing the top of the air chamber and a centralized exhaust and intake mechanism located in the said plate and operatively connected to the upper portion of the diaphragm above the plunger.

4. In an air pump, the combination with a cylinder, of an air casing having intake passages, said air casing being isolated from the cylinder aforesaid, an intermediate air reservoir located in said air casing having direct connections with the air casing aforesaid, a diaphragm mounted in said casing and arranged to alternately create a suction and compression within itself, and a centralized discharge and intake for said diaphragm.

5. In an air pump, the combination with a cylinder, of an air casing having intake passages, said air casing being isolated from the cylinder aforesaid, an intermediate air reservoir located in said air casing having direct connections with the air casing aforesaid, a diaphragm mounted in said casing and arranged to alternately create a suction and compression within itself, a centralized discharge for said diaphragm, said discharge passing through the intermediate air reservoir aforesaid, and an intake adjacent to said discharge connecting the interior of said diaphragm with the intermediate air reservoir.

6. The combination with a casing, of a flexible diaphragm inclosing a chamber mounted in said casing, an air reservoir located within said casing and connected therewith, and a plug extending through said air reservoir provided with an exhaust passage connecting with the interior of the diaphragm, and intake passages connecting the air reservoir with the interior of the diaphragm.

7. The combination with a casing, of a flexible diaphragm inclosing a chamber mounted in said casing, an air reservoir located within said casing and connected therewith, a top plate on said casing, and a plug mounted on said plate and extending through said air reservoir provided with an exhaust passage connecting with the interior of the diaphragm, and intake passages provided with a common automatically-operable valve for connecting the air reservoir with the interior of the diaphragm.

8. The combination with a casing, of a flexible diaphragm inclosing a chamber mounted in said casing, an air reservoir located within said casing and connected therewith, and a plug extending through the air reservoir provided with a central passage having divergent extensions extending to the interior of the diaphragm and convergent passages communicating between the reservoir and the interior of the diaphragm.

9. The combination with a casing, of a flexible diaphragm inclosing a chamber mounted in said casing, an air reservoir located within said casing and connected therewith, a plug extending through the air reservoir provided with a central passage having divergent extensions extending to the interior of the diaphragm and convergent passages communicating between the reservoir and the interior of the diaphragm, a ball valve for the central passage, and means for closing the convergent passages between the air reservoir and the diaphragm.

10. The combination with a casing, of a flexible diaphragm inclosing a chamber mounted in said casing, an air reservoir located within said casing and connected therewith, a plug extending through the air reservoir provided with a central passage having divergent extensions extending to the interior of the diaphragm and convergent passages communicating between the reservoir and the interior of the diaphragm, a ball valve for the central passage, and a plate valve operating over the inner terminals of the convergent passages forming communication between the reservoir and the interior of the diaphragm aforesaid.

11. In an air pump, a lower cylinder, a casing of larger circumference mounted upon said cylinder, a flexible diaphragm inclosed in said casing, a top plate on said casing, air exhausting and intaking means for said diaphragm mounted in said top plate, an operating plunger depending from the diaphragm within the lower cylinder, a shaft journaled in the lower portion of the cylinder, and an eccentric on the shaft bearing against the lower end of the plunger.

12. In an air pump, a lower cylinder, a casing of larger circumference mounted upon said cylinder, a flexible diaphragm inclosed in said casing, a top plate on said casing, air exhausting and intaking means for said diaphragm mounted in said top plate, an operating plunger depending from the diaphragm within the lower cylinder, a shaft journaled in the lower portion of the cylinder, an eccentric on the shaft bearing against the lower end of the plunger, and a spring for maintaining the plunger end in contact with the eccentric.

13. In an air pump, a lower cylinder, a casing of larger circumference mounted upon said cylinder, a flexible diaphragm inclosed in said casing, a top plate on said casing, air exhausting and intaking means for said diaphragm mounted in said top plate, an operating plunger depending from the diaphragm within the lower cylinder, a shaft journaled in the lower portion of the cylinder, an eccentric on the shaft, and a roller mounted in the lower end of the plunger and arranged to engage the periphery of the eccentric.

14. In an air pump, a lower cylinder, a casing of larger circumference mounted upon said cylinder, a flexible diaphragm inclosed in said casing, a top plate on said casing, air exhausting and intaking means for said diaphragm mounted in said top plate, an operating plunger depending from the diaphragm within the lower cylinder, a shaft journaled in the lower portion of the cylinder, an eccentric on the shaft, a roller mounted in the lower end of the plunger and arranged to engage the periphery of the eccentric, and a spring arranged to maintain the roller in contact with the eccentric.

15. In an air pump, a lower cylinder, an upper casing, air pumping diaphragm mechanism within the casing, operating mechanism in the cylinder including a plunger connected to the diaphragm, and a separating partition between the casing and cylinder having a tubular slideway for the plunger.

In testimony whereof I have hereunto affixed my name in the presence of two witnesses.

EMIL KOTTUSCH.

Witnesses:
 MAY D. FLYNN,
 ROBT. KLOTZ.